US006427189B1

(12) United States Patent
Mulla et al.

(10) Patent No.: US 6,427,189 B1
(45) Date of Patent: Jul. 30, 2002

(54) MULTIPLE ISSUE ALGORITHM WITH OVER SUBSCRIPTION AVOIDANCE FEATURE TO GET HIGH BANDWIDTH THROUGH CACHE PIPELINE

(75) Inventors: Dean A. Mulla, Saratoga, CA (US); Reid James Riedlinger; Tom Grutkowski, both of Fort Collins, CO (US)

(73) Assignees: Hewlett-Packard Company, Palo Alto; Intel Corporation, Santa Clara, both of CA (US)

( * ) Notice: Subject to any disclaimer, the term of this patent is extended or adjusted under 35 U.S.C. 154(b) by 0 days.

(21) Appl. No.: 09/510,973

(22) Filed: Feb. 21, 2000

(51) Int. Cl.[7] .............................................. G06F 13/00
(52) U.S. Cl. ...................... 711/122; 711/131; 711/141; 711/151; 711/169; 710/39
(58) Field of Search .................................. 711/141, 144, 711/131, 149, 151, 158, 169, 140, 122; 710/39, 54, 112

(56) References Cited

U.S. PATENT DOCUMENTS

| 4,899,275 A | | 2/1990 | Sachs et al. ................... 711/3 |
| 5,179,675 A | | 1/1993 | Cole et al. ..................... 711/3 |
| 5,493,660 A | | 2/1996 | DeLano et al. ............. 711/206 |
| 5,577,225 A | | 11/1996 | McClure ..................... 711/118 |
| 5,745,729 A | * | 4/1998 | Greenley et al. ............ 711/122 |
| 5,835,934 A | | 11/1998 | Tran .............................. 711/3 |
| 5,918,245 A | | 6/1999 | Yung ........................... 711/122 |
| 5,956,752 A | | 9/1999 | Mathews ..................... 711/204 |
| 6,021,471 A | * | 2/2000 | Stiles et al. ................. 711/140 |
| 6,138,208 A | | 10/2000 | Dhong et al. ............... 711/131 |
| 6,226,713 B1 | * | 5/2001 | Mehrotra ..................... 711/122 |
| 6,237,064 B1 | * | 5/2001 | Kumar et al. ............... 711/122 |
| 6,272,597 B1 | * | 8/2001 | Fu et al. ...................... 711/122 |
| 6,272,601 B1 | * | 8/2001 | Nunez et al. ............... 711/140 |

* cited by examiner

Primary Examiner—Glenn Gossage

(57) ABSTRACT

A multi-level cache structure and associated method of operating the cache structure are disclosed. The cache structure uses a queue for holding address information for a plurality of memory access requests as a plurality of entries. The queue includes issuing logic for determining which entries should be issued. The issuing logic further comprises find first logic for determining which entries meet a predetermined criteria and selecting a plurality of those entries as issuing entries. The issuing logic also comprises lost logic that delays the issuing of a selected entry for a predetermined time period based upon a delay criteria. The delay criteria may, for example, comprise a conflict between issuing resources, such as ports. Thus, in response to an issuing entry being oversubscribed, the issuing of such entry may be delayed for a predetermined time period (e.g., one clock cycle) to allow the resource conflict to clear.

20 Claims, 11 Drawing Sheets

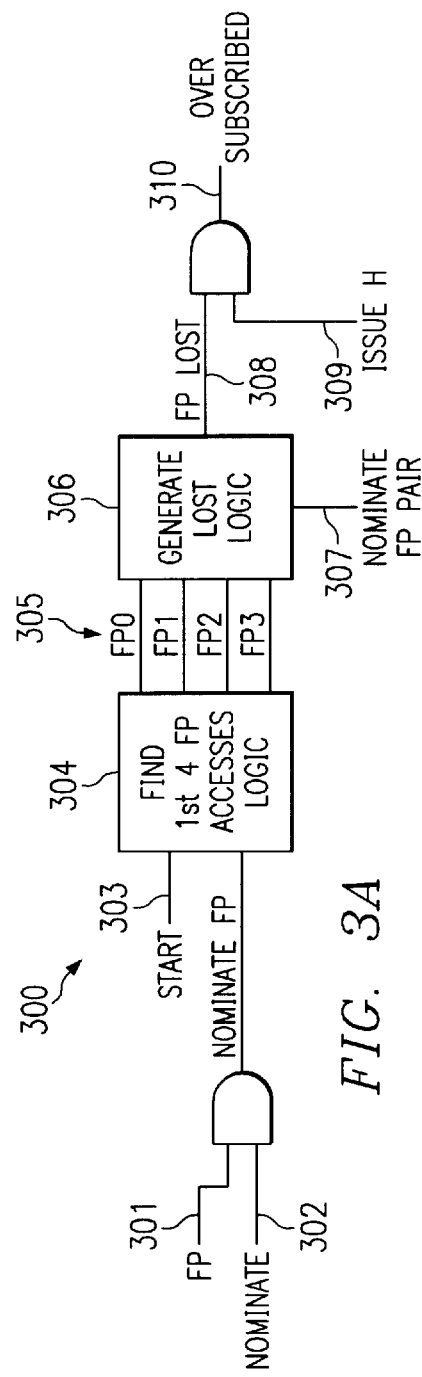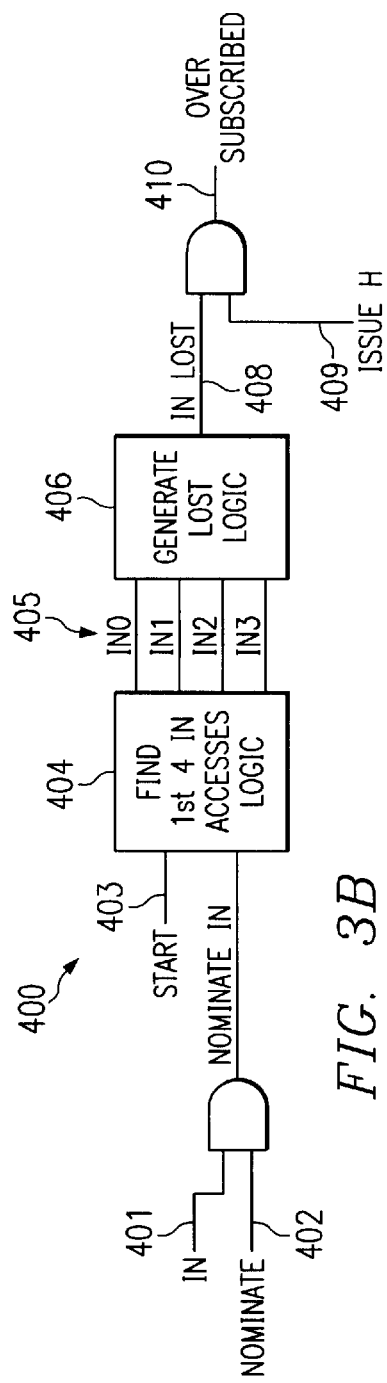

MULTIPLE ISSUE ALGORITHM WITH OVER SUBSCRIPTION AVOIDANCE FEATURE TO GET HIGH BANDWIDTH THROUGH CACHE PIPELINE

RELATED APPLICATIONS

This application is related to co-pending and commonly assigned patent application Ser. No. 09/501,396 entitled "METHOD AND SYSTEM FOR EARLY TAG ACCESSES FOR LOWER-LEVEL CACHES IN PARALLEL WITH FIRST-LEVEL CACHE," co-pending and commonly assigned U.S. patent application Ser. No. 09/510,285 entitled "L1 CACHE MEMORY," co-pending and commonly assigned U.S. patent application Ser. No. 09/510,283 entitled "CACHE CHAIN STRUCTURE TO IMPLEMENT HIGH BANDWIDTH LOW LATENCY CACHE MEMORY SUBSYSTEM," co-pending and commonly assigned U.S. patent application Ser. No. 09/510,279 entitled "CACHE ADDRESS CONFLICT MECHANISM WITHOUT STORE BUFFERS," and and commonly assigned U.S. patent application Ser. No. 09/507,333 entitled "MULTI-PORTED REGISTER STRUCTURES WITH A PULSE WRITE MECHANISM," now U.S. Pat. No. 6,208,656, the disclosures of which are hereby incorporated herein by reference.

TECHNICAL FIELD

This application is related in general to cache memory subsystems, and in specific to on-chip caches with queuing structures and out-of-order caches.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is generally transparent to a computer program at the instruction level and can thus be added to a computer architecture without changing the instruction set or requiring modification to existing programs.

Computer processors typically include cache for storing data. When executing an instruction that requires access to memory (e.g., read from or write to memory), a processor typically accesses cache in an attempt to satisfy the instruction. Of course, it is desirable to have the cache implemented in a manner that allows the processor to access the cache in an efficient manner. That is, it is desirable to have the cache implemented in a manner such that the processor is capable of accessing the cache (i.e., reading from or writing to the cache) quickly so that the processor may be capable of executing instructions quickly. Caches have been configured in both on chip and off-chip arrangements. On-processor-chip caches have less latency, since they are closer to the processor, but since on-chip area is expensive, such caches are typically smaller than off-chip caches. Off-processor-chip caches have longer latencies since they are remotely located from the processor, but such caches are typically larger than on-chip caches.

A prior art solution has been to have multiple caches, some small and some large. Typically, the smaller caches would be located on-chip, and the larger caches would be located off-chip. Typically, in multi-level cache designs, the first level of cache (i.e., L0) is first accessed to determine whether a true cache hit for a memory access request is achieved. If a true cache hit is not achieved for the first level of cache, then a determination is made for the second level of cache (i.e., L1), and so on, until the memory access request is satisfied by a level of cache. If the requested address is not found in any of the cache levels, the processor then sends a request to the system's main memory in an attempt to satisfy the request. In many processor designs, the time required to access an item for a true cache hit is one of the primary limiters for the clock rate of the processor if the designer is seeking a single-cycle cache access time. In other designs, the cache access time may be multiple cycles, but the performance of a processor can be improved in most cases when the cache access time in cycles is reduced. Therefore, optimization of access time for cache hits is critical for the performance of the computer system.

Prior art cache designs for computer processors typically require "control data" or tags to be available before a cache data access begins. The tags indicate whether a desired address (i.e., an address required for a memory access request) is contained within the cache. Accordingly, prior art caches are typically implemented in a serial fashion, wherein upon the cache receiving a memory access request, a tag is obtained for the request, and thereafter if the tag indicates that the desired address is contained within the cache, the cache's data array is accessed to satisfy the memory access request. Thus, prior art cache designs typically generate tags indicating whether a true cache "hit" has been achieved for a level of cache, and only after a true cache hit has been achieved is the cache data actually accessed to satisfy the memory access request. A true cache "hit" occurs when a processor requests an item from a cache and the item is actually present in the cache. A cache "miss" occurs when a processor requests an item from a cache and the item is not present in the cache. The tag data indicating whether a "true" cache hit has been achieved for a level of cache typically comprises a tag match signal. The tag match signal indicates whether a match was made for a requested address in the tags of a cache level. However, such a tag match signal alone does not indicate whether a true cache hit has been achieved.

As an example, in a multi-processor system, a tag match may be achieved for a cache level, but the particular cache line for which the match was achieved may be invalid. For instance, the particular cache line may be invalid because another processor has snooped out that particular cache line. As used herein a "snoop" is an inquiry from a first processor to a second processor as to whether a particular cache address is found within the second processor. Accordingly, in multi-processor systems a MESI signal is also typically utilized to indicate whether a line in cache is "Modified, Exclusive, Shared, or Invalid." Therefore, the control data that indicates whether a true cache hit has been achieved for a level of cache typically comprises a MESI signal, as well as the tag match signal. Only if a tag match is found for a level of cache and the MESI protocol indicates that such tag match is valid, does the control data indicate that a true cache hit has been achieved. In view of the above, in prior art cache designs, a determination is first made as to whether a tag match is found for a level of cache, and then a determination is made as to whether the MESI protocol indicates that a tag match is valid. Thereafter, if a determination has been made that a true tag hit has been achieved, access begins to the actual cache data requested.

An example of a prior art, multi-level cache design is shown in FIG. 4. The exemplary cache design of FIG. 4 has a three-level cache hierarchy, with the first level referred to as L0, the second level referred to as L1, and the third level referred to as L2. Accordingly, as used herein L0 refers to the first-level cache, L1 refers to the second-level cache, L2 refers to the third-level cache, and so on. It should be understood that prior art implementations of multi-level cache design may include more than three levels of cache, and prior art implementations having any number of cache levels are typically implemented in a serial manner as illustrated in FIG. 4. As discussed more fully hereafter, multi-level caches of the prior art are generally designed such that a processor accesses each level of cache in series until the desired address is found. For example, when an instruction requires access to an address, the processor typically accesses the first-level cache L0 to try to satisfy the address request (i.e., to try to locate the desired address). If the address is not found in L0, the processor then accesses the second-level cache L1 to try to satisfy the address request. If the address is not found in L1, the processor proceeds to access each successive level of cache in a serial manner until the requested address is found, and if the requested address is not found in any of the cache levels, the processor then sends a request to the system's main memory to try to satisfy the request.

Typically, when an instruction requires access to a particular address, a virtual address is provided from the processor to the cache system. As is well-known in the art, such virtual address typically contains an index field and a virtual page number field. The virtual address is input into a translation look-aside buffer ("TLB") 510 for the L0 cache. The TLB 510 provides a translation from a virtual address to a physical address. The virtual address index field is input into the L0 tag memory array(s) 512. As shown in FIG. 4, the L0 tag memory array 512 may be duplicated N times within the L0 cache for N "ways" of associativity. As used herein, the term "way" refers to a partition of the lower-level cache. For example, the lower-level cache of a system may be partitioned into any number of ways. Lower-level caches are commonly partitioned into four ways. As shown in FIG. 4, the virtual address index is also input into the L0 data array structure(s) (or "memory structure(s)") 514, which may also be duplicated N times for N ways of associativity. The L0 data array structure(s) 514 comprise the data stored within the L0 cache, which may be partitioned into several ways.

The L0 tag 512 outputs a physical address for each of the ways of associativity. That physical address is compared with the physical address output by the L0 TLB 510. These addresses are compared in compare circuit(s) 516, which may also be duplicated N times for N ways of associativity. The compare circuit(s) 516 generate a "hit" signal that indicates whether a match is made between the physical addresses. As used herein, a "hit" means that the data associated with the address being requested by an instruction is contained within a particular cache. As an example, suppose an instruction requests an address for a particular data labeled "A." The data label "A" would be contained within the tag (e.g., the L0 tag 512) for the particular cache (e.g., the L0 cache), if any, that contains that particular data. That is, the tag for a cache level, such as the L0 tag 512, represents the data that is residing in the data array for that cache level. Therefore, the compare circuitry, such as compare circuitry 516, basically determines whether the incoming request for data "A" matches the tag information contained within a particular cache level's tag (e.g., the L0 tag 512). If a match is made, indicating that the particular cache level contains the data labeled "A," then a hit is achieved for that particular cache level.

Typically, the compare circuit(s) 516 generate a single signal for each of the ways, resulting in N signals for N ways of associativity, wherein such signal indicates whether a hit was achieved for each way. The hit signals (i.e., "L0 way hits") are used to select the data from the L0 data array(s) 514, typically through multiplexer ("MUX") 518. As a result, MUX 518 provides the cache data from the L0 cache if a way hit is found in the L0 tags. If the signals generated from the compare circuitry 516 are all zeros, meaning that there was no hit generated in the L0 cache, then "miss" logic 520 is used to generate a L0 cache miss signal. Such L0 cache miss signal then causes the memory instruction requesting access to a particular address to be sent to the L1 instruction queue 522, which queues (or holds) memory instructions that are waiting to access the L1 cache. Accordingly, if it is determined that the desired address is not contained within the L0 cache, a request for the desired address is then made in a serial fashion to the L1 cache.

In turn, the L1 instruction queue 522 feeds the physical address index field for the desired address into the L1 tag(s) 524, which may be duplicated N times for N ways of associativity. The physical address index is also input to the L1 data array(s) 526, which may also be duplicated N times for N ways of associativity. The L1 tag(s) 524 output a physical address for each of the ways of associativity to the L1 compare circuit(s) 528. The L1 compare circuit(s) 528 compare the physical address output by L1 tag(s) 524 with the physical address output by the L1 instruction queue 522. The L1 compare circuit(s) 528 generate an L1 hit signal(s) for each of the ways of associativity indicating whether a match between the physical addresses was made for any of the ways of L1. Such L1 hit signals are used to select the data from the L1 data array(s) 526 utilizing MUX 530. That is, based on the L1 hit signals input to MUX 530, MUX 530 outputs the appropriate L1 cache data from L1 data array(s) 526 if a hit was found in the L1 tag(s) 524. If the L1 way hits generated from the L1 compare circuitry 528 are all zeros, indicating that there was no hit generated in the L1 cache, then a miss signal is generated from the "miss" logic 532. Such an L1 cache miss signal generates a request for the desired address to the L2 cache structure 534, which is typically implemented in a similar fashion as discussed above for the L1 cache. Accordingly, if it is determined that the desired address is not contained within the L1 cache, a request for the desired address is then made in a serial fashion to the L2 cache. In the prior art, additional levels of hierarchy may be added after the L2 cache, as desired, in a similar manner as discussed above for levels L0 through L2 (i.e., in a manner such that the processor accesses each level of the cache in series, until an address is found in one of the levels of cache). Finally, if a hit is not achieved in the last level of cache (e.g., L2 of FIG. 4), then the memory request is sent to the processor system bus to access the main memory of the system.

In view of the above, prior art caches are typically implemented in a serial fashion, with each subsequent cache being connected to a predecessor cache by a single port. Thus, prior art caches have been only able to handle limited numbers of requests at one time. Therefore, the prior art caches have not been able to provide high enough bandwidth back to the Central Processing Unit (CPU) core, which means that the designs of the prior art increase latency in retrieving data from cache, which slows the execution unit within the core of a chip. That is, while an execution unit is awaiting data from cache, it is stalled, which results in a net lower performance for a system's processor.

SUMMARY OF THE INVENTION

These and other objects, features and technical advantages are achieved by a system and method which uses an L1 cache that has multiple ports. The inventive cache uses separate queuing structures for data and instructions, thus allowing out-of-order processing. The inventive cache uses ordering mechanisms that guarantee program order when there are address conflicts and architectural ordering requirements. The queuing structures are snoopable by other processors of a multiprocessor system. This is required because the tags are before the queues in the pipeline. Note that this means the queue contains tag state including hit/miss information. When a snoop is performed on the tags, if it is not also performed on the queue, the queue would believe it has a hit for a line no longer present in the cache. Thus, the queue must be snoopable by other processors in the system.

The inventive cache has a tag access bypass around the queuing structures, to allow for speculative checking by other levels of cache and for lower latency if the queues are empty. The inventive cache allows for at least four accesses to be processed simultaneously. The results of the access can be sent to multiple consumers. The multiported nature of the inventive cache allows for a very high bandwidth to be processed through this cache with a low latency.

The inventive cache uses an issuing mechanism to determine which entries in the queue should issue first and which are ready to issue. The inventive cache uses circuitry that "finds the first one" to determine which access will issue from the queue. Since the cache has multiple ports, more than one access can issue, e.g. having four ports allows for four accesses to issue in the same cycle. Thus, multiple "find first one" circuits operate in parallel to determine the issuing accesses. Note that the multiple circuits may be viewed as a single "find first four" circuit. These circuits also determine resource conflict among issuing accesses. The inventive cache can also issue accesses that require more than one cycle to complete. The "find first one" circuits also generate a signal that is to be attached to each of those accesses which indicates whether or not this access has all the resources it needs to complete in the issuing clock cycle or whether additional clock cycles will be needed. This signal is referred to as the oversubscribed signal. For example, suppose there are four issuing accesses, two are oversubscribed and two are not, then the two not oversubscribed are issued normally and the two oversubscribed accesses are saved until the resource conflicts clear, and then they are sent to their respective consumers. Further issues that require the same resources are held up until the oversubscribed accesses have been issued, e.g. use the resources that they require. However, other accesses that do not use the same resources, e.g. stores, are allowed to issue on the next clock.

It is a technical advantage of the invention to be able to have at least four accesses at a time going out to the data arrays.

It is another technical advantage to be able to issue resource-conflicted accesses in parallel and still be able to perform them in the next clock.

It is a further technical advantage of the invention to be able to issue more accesses than can be completed with the available resources in parallel. This provides more efficient accesses into memory and, given that multiple resource-conflict areas can exist, it allows the issuing of accesses in the next clock that do not have resource conflicts with the accesses that are now delayed.

It is a still further technical advantage of the invention to provide the capability to pack more accesses into a fixed amount of time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 3A depicts one instance of the issuing mechanism for floating point information;

FIG. 3B depicts one instance of the issuing mechanism for integer information;

DETAILED DESCRIPTION

Figure 1:
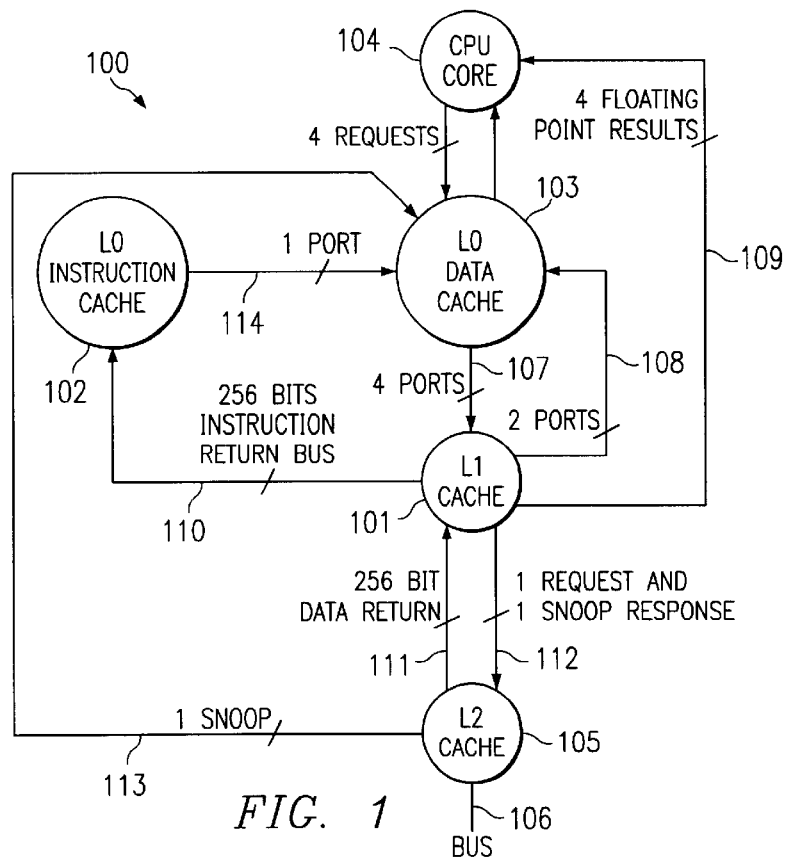
FIG. 1 is a block diagram depicting the inventive cache arrangement.

FIG. 1 is a block diagram depicting the arrangement 100 of the L1 cache 101 with the L0 instruction cache (L0i) 102, L0 data (L0d) cache 103, CPU 104, and the L2 cache 105 and the information pathways between the caches, CPU 104, and system bus 106.

The L1 cache 101, which is a combined data and instruction cache, receives access requests from the L0d cache 103. Included in that L1 cache 101 are queuing structures that hold the tags and the data for information stored in the cache. The L1 cache 101 is configured to be able to receive, every clock cycle, 4 accesses or access requests from the L0d cache 103, via 4 ports 107. The accesses may be stores or loads. A store is a memory access request desiring to write data to cache. A load is a memory access request desiring to read data from the cache. L1 cache 101 uses a pipeline and two queues to manage the access requests. The accesses can be pulled from the pipeline or the queues for processing. The L1 cache 101 may supply up to two integer results per clock, via two ports 108, to the L0d cache 103. These integer results may be sent by the L0d cache 103 to the integer general registers in the CPU core 104. The L1 cache 101 can also supply up to 4 floating point results per clock, via four ports 109, directly to the floating point registers of the CPU core 104. The L1 cache 101 can also send 256 bits of instruction data to the L0i cache 102 via return bus 110. The interfaces permit the L1 cache 101 to communicate with the other caches, CPU, and other elements coupled to the bus 106. Bus 113 provides multi-processor support, by allowing snoop requests from other processors to access the L0 cache. Note that a snoop request will be passed on to L1 cache 101 as if the snoop was a CPU request.

Path 114, between L0i cache 102 and L0d cache 103, is for instruction fetch requests that have missed the L0i cache 102. The L0i cache 102 makes a request of the L0d cache 103 for a line of memory containing instructions to execute. The L0d cache 103 utilizes an unused one of the 4 ports 107 to send the instruction request to the L1 cache 101.

Path 112 is actually 2 paths. The request part of path 112 is used for sending data or instruction accesses to the L2 cache 105. These requests may be speculatively sent, i.e. before knowledge of an access miss of the L1 cache 101 in order to minimize the latency of accessing the L2 cache 105. The L2 105 provides a full line of data in 4 clocks over the data return bus 111 to the L1 cache 101. The L1 cache 101 fills the full line of data into the L1 cache 101 and can bypass the result to the necessary consumer which could be any of L0i cache 102, L0d cache 103, or CPU 104. The other path of path 112 is the snoop response path. For a snoop of the L1 cache 101, the L1 cache 101 provides a report to the L2/Bus Cluster 105 regarding the status of the line in the L1 cache 101. This result is provided utilizing the snoop response path part of path 112.

Note that instruction return bus 110, new access ports 107, integer return ports 108, floating point (fp) return ports 109, L2 path 112, and data return bus 111 can all be active at the same time with some time restrictions. The biggest restriction is on the fp return ports 109, integer return ports 108, and instruction return bus 110. There are several possible maximal combinations of activity that can be supported. The limitations are based upon the 4 access per clock limitation for data accesses, the array limitations of only being able to supply 512 bits per clock, and the oversubscribe logic which can alleviate resource conflict blockages to some extent. The possible simultaneous port usage from L1 return ports 109, 108, and bus 110, is as follow:

| FP Ports | Integer Ports | Instruction |
|---|---|---|
| 2 | 2 | yes |
| 4 | 0 | yes |
| 4 | 2 | no |

Note that the two integer ports 108 with the four fp ports 109 are really using the integer ports 108 to send a line of data to the L0d cache 103.

The arrangement 100 operates as follows. For example, the CPU 104 issues an integer load type instruction, which is sent to the L0d cache 103 and to the L1 cache 101 in parallel. The tags of each cache are accessed in parallel. Note that the tags of the L1 cache 101 are being accessed speculatively, in other words assuming that the L0d cache 103 does not have the data and will miss. If the L0d cache 103 does miss, then the L1 cache 101 will use the results of that speculative tag access to determine if it has the data or not. If the L0d cache 103 does have the requested data, then the L0d cache 103 will return the data to the CPU 104 core register file, and the L1 cache 101 will halt accessing, even though it has speculatively accessed the tags and may have also speculatively accessed the data. The L0d cache 103 sends a signal to the L1 cache 101 to inform the L1 cache 101 of a hit or miss. If the L0d cache 103 has a miss, and the L1 cache 101 has a hit, then the integer data is returned to the L0d cache 103, via ports 108. The data could be used in moving a line of data up to the L0d cache 103, or may be sent via the L0d cache 103, to the CPU 104 core integer register file, or both.

After the L1 cache 101 receives the speculative request from the L0 cache, the L1 cache 101 sends a speculative request to the L2 cache 105. If the L1 cache 101 misses, then the L1 cache 101 allocates a line in its array, in anticipation of a data return from L2 cache 105. Note that bus 112, which carries the speculative request to the L2 cache 105 is a single port bus, capable of carrying one request per clock cycle, so priority select structures are used to connect the appropriate L2 cache structures to the bus. If the L2 cache 105 has the data, and assuming that the L0 cache and the L1 cache do not, then the L2 cache 105 will send that data back to the L1 cache 101. The L1 cache 101 will fill that data into the L1 cache 101. First, it buffers up an entire line, including the requested data, and then it writes the line into the L1 cache array. In parallel with the buffering, the cache also sends the requested data to the L0d cache 103, and/or the CPU core 104. If the L2 cache 105 misses, the L2 cache 105 uses its BRQ structure, or Bus Request Queue, to send a request on to the processor interface memory bus or system bus. This request will retrieve a line from Random Access Memory (RAM) memory. Note that the L2 cache 105 may be larger than the L1 cache 101, and the L1 cache 101 may be larger than the combination of L0i cache 102 and L0d cache 103. Also note that the L0 cache is split so that the relevant portions are located closer to the processor consumer components that use the respective cache portions, thereby reducing latency. Further note that L0, L1 and L2 caches may all be located on the processor chip to reduce latency.

Figure 2A:
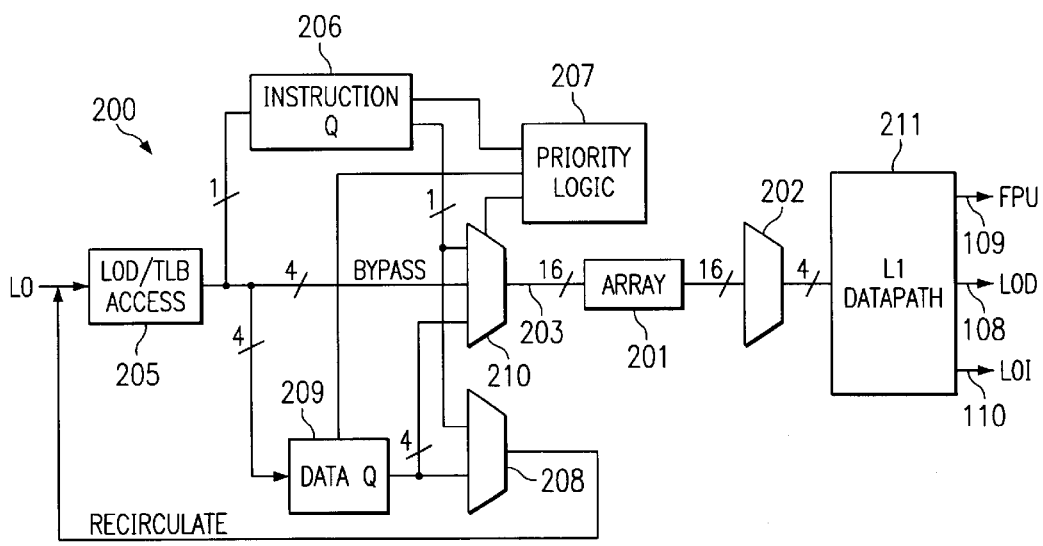
FIGS. 2A and 2B depict the internal elements of the L1 cache of FIG. 1.

FIG. 2A depicts the arrangement 200 of elements of the L1 cache 101 of FIG. 1 used in managing a load access or instruction fetch from the L0 cache. The pipeline stages for an access that flows through to access the L1 tags are L0M, L0D, and L0W. The pipeline stages for an access that flows through to access the L1 cache 101 are L1N, L1I, L1A, L1M, L1D, L1C, and L1W. This flow arrangement 200 begins with the tag access and ends with the return of the result (data) to the L0 cache or to the CPU. An access, including the physical address, is sent from the L0d cache 103 to the L1 cache 101, wherein the tags are accessed at block 205 to determine if there is a hit. Note that block 205 combines the L0d cache 103 and the TLB. The L1 cache tags are not inside block 205. They could be drawn as a separate box parallel to L0d cache/TLB 205. Then, the tags would be accessed in parallel to L0d cache/TLB 205, and L0d cache/TLB 205 would show an output (physical address) feeding the L1 tags to finalize the tag hit information. Further note that this is true for both data and instruction accesses. If there is a hit, the access is sent to either the instruction queue 206 or the data queue 209. The instruction queue 206 holds up to eight entries until they are completed or passed on to the L2 cache 105. The data queue 209 holds up to thirty two entries until they are completed or passed on to the L2 cache 105. The queues are split to prevent priority problems between the instructions and data. Entries that are issued out of each queue, but which are not processed through Multiplexor (MUX) 210 are recirculated by MUX 208 back to the L1 tag access stage 205 for re-entry back into their respective queues.

Priority logic 207 controls the MUX 210, and thereby chooses one of the data queue 209 (up to four locations) and the instruction queue 206 as providing the source of the location for the array 201. MUX 210 may also select from the L1 tag access stage 205, thereby bypassing the queues.

A bypass is selected when nothing 'better' is available to choose, i.e. if there is an access the data or the instruction queue have to process, that will be done instead of the bypass. This is good because it helps do things in program order, and because the bypasses are speculative, i.e. these accesses may be able to have their data provided by the L0d cache. The priority logic uses information about what each of the queues will issue next and determines which information has priority, and selects the higher priority source. Note that MUX 210 is a cascaded or multi-leveled MUX, but is shown as a single level MUX for simplicity. The output 203 of the MUX 210 is used as control information in selecting the locations to read in the array 201. The control information comprises an address or index, way, and read/write (load/store) information. Note that the output from MUX 210 has 16 buses, one for each of 16 banks of the array 201. The desired bit line is read out from the array 201, and mapped onto the four port buses by MUX 202. The bit line is sent through the L1 data path 211 to one of three consumers, the CPU via floating point result buses (or ports) 109, the L0d cache 103 via two integer ports (or buses) 108, or the L0i cache 102 via return bus 110. Note that store requests are processed in a similar manner.

Figure 2B:
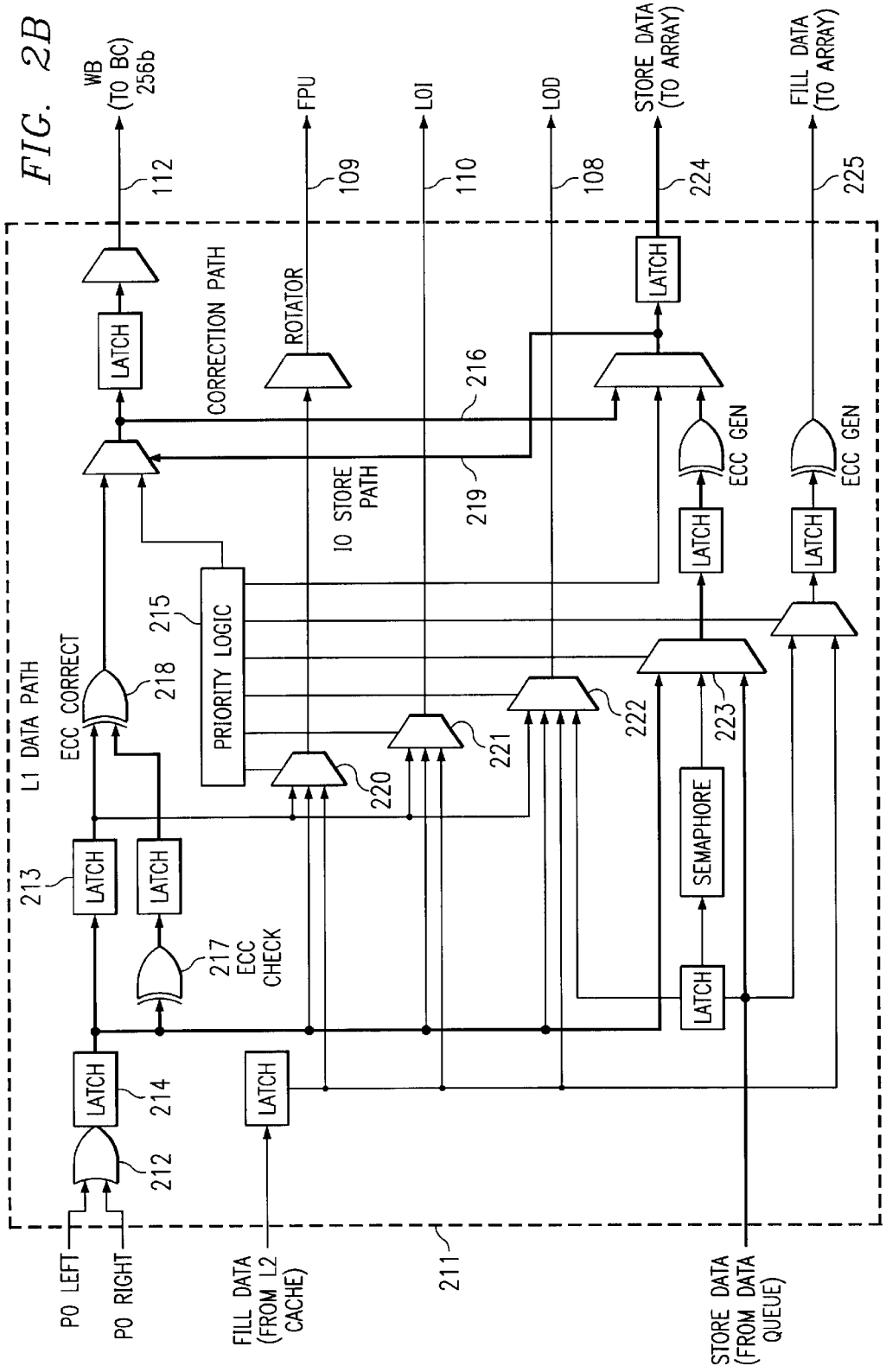

The circuitry of FIG. 2A is replicated three more times, for ports P1, P2, and P3. The L1 data path circuit 211 routes the information to the proper place, as described in greater detail below in conjunction with FIG. 2B. For example, the P0–P3 information could be routed to the bus cluster (bc) for writing data back (WB) to main memory, via bus 106 and path 112. Data transfers to the L2 cache would also be sent via port bus 112. The P0–P3 information could also be sent to the floating point unit, via port 109, to the L0i cache 102, via return bus 110, or the L0d cache 103, via port 108. Turning to FIG. 2B, priority logic 215 of L1 data path circuit 211 is connected to the MUXs 220, 221, 222, and 223 to control the destination of the data. Note that the data can be sent to more than one consumer, e.g. to the floating point unit and the L0d cache, however, the data can be taken from only one source, i.e. ports P0–P3, fill, or store. The L1 data path circuit 211 also uses latches to maintain proper state during data movement, and also uses Error Correction Code (ECC) to detect and correct errors in the data. The L1 data path circuit 211 uses a rotator to support both little endian and big endian register file formats for the CPU 104. For example, the number 23 may be stored as 23 (little endian) or 32 (big endian). Data sent to the L0 cache does not require rotation, as it has its own rotator for sending information to the CPU 104. L1 data path circuit 211 also supports semaphore operations, which are atomic read/modify/write operations, meaning that the operations cannot be snooped or otherwise interrupted.

Note that latches 213 and 214 allow two cycles of data to be used, the oldest data is stored in latch 213 and the youngest is stored in latch 214. Both latches are connected to the MUXs that feed the FPU port 109, L0i cache 102 via return bus 110, and the L0d cache 103 via port 108. Thus, two cycles of data can be sent to these consumers. Latch 214 is connected to the MUX that feeds the store data port 224. Input/Output (IO) store path 219 allows store data to be sent to the L2 cache or to the bus cluster via path 112.

Note that portions of FIGS. 2A–2B are used in store/fill operations. A store operation is where information is written into the cache array as a result of a store command or instruction. A fill operation is where information is moved up from the L2 cache or down from the L0 cache into the L1 cache. Fill data is typically a cache line of data sent in response to a request. Note that ECC (error correction code) is generated for both the fill and store information, and is also written into the array. A store can comprise more or less than the width of a cache bank in size. For example, a cache bank is 128 bits in width, and a write operation can write as small as a 32 bit chunk of memory, without disturbing the other 96 bits of that bank. This increases performance because no other steps are needed for 32- or 64-bit writes. Chunks smaller than 32 bits, can be written, e.g. 8 or 16 bits, but for writes that small the difference between 32 bits must be read out and merged with the store. In other words, a small store includes both a load and a store. For example, storing 8 bits requires another 24 bits to be read out and merged with the 8 bits to form a total of 32 bits for the write operation. MUX 223 facilitates the reading out of additional bits from ports P0–P3 and the merging.

The L1 data path circuit 211 also includes correction path 216. The correction path 216 allows for later correction of a detected error. Thus, only data with errors will pass through correction. By implementing late correction, error free data is not slowed by having to pass through correction. Error free data will pass from latch 214 (or latch 213) to one or more of the output ports 108, 109, 110, 112, 224, and/or 225, via an appropriate MUX. Data with errors, after detection by ECC check 217, is latched and then corrected by ECC error correct 218. The corrected data is then stored in the array via path 224. On a subsequent operation, the now corrected data can be read out of the array and sent to one or more of the output ports 108, 109, 110, 112, 224, and/or 225. Thus, error data is penalized greatly, while error free data is not penalized.

FIGS. 3A and 3B depict the issuing mechanisms 300 and 400 which are located within the data queue 209 of FIG. 2A. This queue 209 holds the associated address information for data access requests or data accesses. After accesses have been inserted into the queue, the accesses then need to be issued from the queue. The desire is to issue them as quickly as possible. To achieve this goal, the issuing mechanism issues as many accesses as is possible on each clock. FIG. 3A depicts one instance of the issuing mechanism 300 for floating point information. FIG. 3B depicts one instance of the issuing mechanism 400 for integer information. There are as many of each of the instances as the maximum entries in the queue. For example, queue 209 holds up to 32 entries, thus there are 32 mechanisms 300, and 32 mechanisms 400, with one of each mechanisms associated with a particular queue entry space.

The accesses in queue 209 could comprise integer or floating point format, and be either a load or a store. Note that this means that the information itself is not floating point or integer, but rather the address information stored in the queue 209 is indexing floating point or integer format information stored in another queue or the array 201. As shown in FIG. 1, the L1 cache 101 has 4 port resources 109 for floating point information and 2 port resources 108 for integer information. Load accesses require port resources, and store accesses do not require port resources. Floating point (fp) information could require 1 or 2 ports to transfer data. Integer (int) information requires only 1 port. Since four accesses can be handled each cycle, the following combinations could occur: 4 loads, 3 loads/1 store, 2 loads/2 stores, 1 load/3 stores, or 4 stores. Mixed formats, i.e. some integer and some floating point can also occur. Over subscription occurs when the resources available are exceeded by the resources required to complete the accesses. Over subscription will occur any time there is more than two integer loads, i.e. three int loads (totaling 3) or four int loads (totaling 4), since only two resources are available. Over subscription will also occur for 3 fp loads of which 2 require two ports (totaling 5), 3 fp loads of which 3 require two ports (totaling 6), 4 fp loads of which 1 requires two ports (totaling 5), 4 fp loads of which 2 require two ports (totaling 6), 4 fp loads of which 3 require two ports (totaling 7), or 4 fp loads of which 4 require two ports (totaling 8), since only 4 resources are available.

FIG. 3A depicts the issuing mechanism 300 for floating point information. The mechanism 300 receives a floating point bit 301 from information stored in the queue indicating that the information is in floating point format. Each entry contains logic (not shown) to generate a nominate bit 302, if the entry meets three criteria. First, the entry must be marked valid. Second, the tag must be marked O.K., meaning that this entry has a) an L1 hit, b) no response to the core, L0, or L2 cache (e.g. is a store), or c) a tag that needs to be re-accessed. And three, is not currently in-flight, meaning already being processed. The issuing mechanism 300 also receives start bits 303, which indicates a starting point of the queue for the oldest access in the queue. These bits are required only if the queue is circular, which means the starting point may vary. For queues with fixed starting points, the start bits 303 are not needed. Note that loads are differentiated from stores, via fp bit 301.

The Find $1^{st}$ four fp accesses logic 304 receives the start bits 303, and the logical AND of the fp bit 301 and the nominate bit 302. This logic 304 is connected to similar logic in other instantiations of issuing mechanism 300 for other entries. This logic 304 determines which floating point accesses in the queue are likely to be issued next, and the likely order that they will be issued. The likely candidates are the four oldest, nominated, fp accesses. The fifth oldest and younger entries are lost, via logic 306. Note that the $3^{rd}$ and $4^{th}$ oldest entries may also be lost, depending on how many pairs of accesses are present. The entry values for the candidates 305, FP0, FP1, FP2, and FP3, are passed to the generate lost logic 306. This logic 306 also receives nominate fp pair bit 307 from information stored in the queue indicating that two FP data values will be returned for the one access, meaning that two ports will be needed to issue this access entry. This logic is connected to similar logic in other instantiations of issuing mechanism 300 for other entries. This logic 306 begins adding the resources required for these four accesses. Some of the accesses may be stores, which require no port resources. Some accesses may require 1 or 2 ports. The logic adds sequentially, i.e. first FP0, then FP0+FP1, then FP0+FP1+FP2, and then FP0+FP1+FP2+FP3. When a total of four resources is reached, any additional resource using access has the FP lost bit 308 activated. For example, if FP0 and FP1 are loads requiring 2 ports each for a total of four ports, and if FP3 and FP4 are stores, then fp lost bit 308 is not activated. However, if FP3 is a 2 port load, and FP4 is a store, then fp lost bit 308 will be activated for FP3, and not activated for FP4. Alternatively, if each of FP3 and FP4 are either 1 or 2 port loads, then the fp lost bit 308 will be activated for both FP3 and FP4.

The fp lost bit 308 is logically ANDed with the issue H bit 309 to produce the over subscribed bit 310. The issue H bit 309 indicates whether the particular access to which the instantiation of issuing mechanism 300 is associated is actually going to issue. Activities such as issuing some integer accesses may cause some of the fp accesses not to issue, for example, issuing three integer loads means that only the oldest fp access, FP0, will be issued. The oversubscribed bit 310 is one of the bits of priority logic 215 which controls MUXes 220, 221, and 222 (FIG. 2B). When the over subscribed bit 310 is not active, this indicates that the MUX 220 should pull from latch 214. Thus, there are sufficient resources for the access request to be issued in this clock cycle. When the over subscribed bit 310 is active, this indicates that the MUX 220 should pull from latch 213. Thus, there is insufficient resources for the access request to be issued in the current clock cycle (i.e. from latch 214), but rather should be pulled from latch 213 in the next clock cycle. Therefore, accesses that have any insufficiency in resources can be issued in the next clock cycle, when the resources are freed up. Note that even though the oversubscribed accesses are issued on the next cycle, they are considered as having been issued together with the accesses of the preceding cycle. Note that while only one MUX 220 is shown in FIG. 2B (for port P0), there are actually four MUXes 220, one for each port.

The benefit is that these four accesses are processed in one clock as far as the pipe line is concerned, even though two clocks are required to issue the accesses. The second clock, or clean up clock, is used to process the over subscribed accesses. During the clean up clock, no additional floating point accesses are issued. Instead other accesses, such as integer accesses, instruction accesses, or stores (either floating point or integer) may be issued, and they would be latched into latch 214, and could be sent out onto L0D port 108, or WB path 112, etc. Thus, the pipe line is packed more efficiently.

FIG. 3B depicts one embodiment of the issuing mechanism 400 for integer information. The mechanism 400 receives an integer (IN) bit 401 from information stored in the queue indicating that the information is in integer format. Each entry contains logic (not shown) to generate a nominate bit 402, if the entry meets three criteria as described above. The issuing mechanism 400 also receives start bits 403, which indicate a starting point of the queue for the oldest access in the queue, as described above. Note that loads are differentiated from stores, via IN bit 401.

The Find $1^{st}$ four IN (integer) accesses logic 404 receives the start bits 403, and the logical AND of the IN bit 401 and the nominate bit 402. This logic 404 is connected to similar logic in other instantiations of issuing mechanism 400 for other entries. This logic 404 determines which integer accesses in the queue are likely to be issued next, and the likely order that they will be issued. The likely candidates are the four oldest, nominated, IN accesses. The fifth oldest and younger entries are lost, via logic 406. The entry values for the candidates 405, IN0, IN1, IN2, and IN3, are passed to the generate lost logic 406. This logic 406 is connected to similar logic in other instantiations of issuing mechanism 400 for other entries. This logic 406 begins adding the resources required for these four accesses. Some of the accesses may be stores, which require no port resources. As stated above, each integer load can only use 1 port, however integer consumers have only 2 ports available for use. Thus, to maintain similarity between issuing mechanisms 300 and 400, generate lost logic 406 can be set such that each integer load will consume 2 resources. Therefore, this effectively limits the resources to two ports. In other words, by doubling the amount of resources consumed by an integer access, the amount of resources is halved from four to two. The logic adds sequentially, i.e. first IN0, then IN0+IN1, then IN0+IN1+IN2, and then IN0+IN1+IN2+IN3. When a total of four resources is reached any additional resource using access has the IN lost bit 408 activated. Note what is actually happening is that the resources really equal to two, but the logic is set to have the resource equal to four. Therefore, when the logic reaches four, the real resource used is two. For example, if IN0 and IN1 are loads and thus require 2 ports each for a total of four ports, and if IN3 and IN4 are stores, then IN lost bit 408 is not activated for either IN3 or IN4. However, if IN3 is a load, and IN4 is a store, then IN lost bit 408 will be activated for IN3, and not activated for IN4. Alternatively, if each of IN3 and IN4 are loads, then the IN lost bit 408 will be activated for both IN3 and IN4.

An alternative to this arrangement is to have the logic 408 set to two port resources, and calculate the lost bit 408 output from logic 406 based on having an integer load use only 1 port.

The IN lost bit 408 is logically ANDed with the issue H bit 409 to produce the over subscribed bit 410. The oversubscribed bit 410 is one of the bits of priority logic 215 which controls MUxes 220, 221, and 222 (FIG. 2B). When the over subscribed bit 410 is not active, this indicates that the MUX 222 should pull from latch 214. Thus, there are sufficient resources for the access request to be issued in this clock cycle. When the over subscribed bit 410 is active, this indicates that the MUX 222 should pull from latch 213. Thus, there is insufficient resources for the access request to be issued in the current clock cycle (i.e. from latch 214), but rather should be pulled from latch 213 in the next clock cycle. Therefore, accesses that have any insufficiency in resources can be issued in the next clock cycle, when the resources are freed up. Note that while only one MUX 222 is shown in FIG. 2B (for port P0), there are actually two MUXes 222, one for each port.

The benefit is that these four accesses are processed in one clock as far as the pipe line is concerned, even though two clocks are required to issue the accesses. The second clock, or clean up clock, is used to process the over subscribed accesses. During the clean up clock, no additional integer accesses are issued. Instead other accesses, such as floating point accesses, instruction accesses, or stores (either floating point or integer), may be issued, and they would be latched into latch 214, and could be sent out onto FPU port 109, or WB path 112, etc. Thus, the pipe line is packed more efficiently.

Figure 3C:
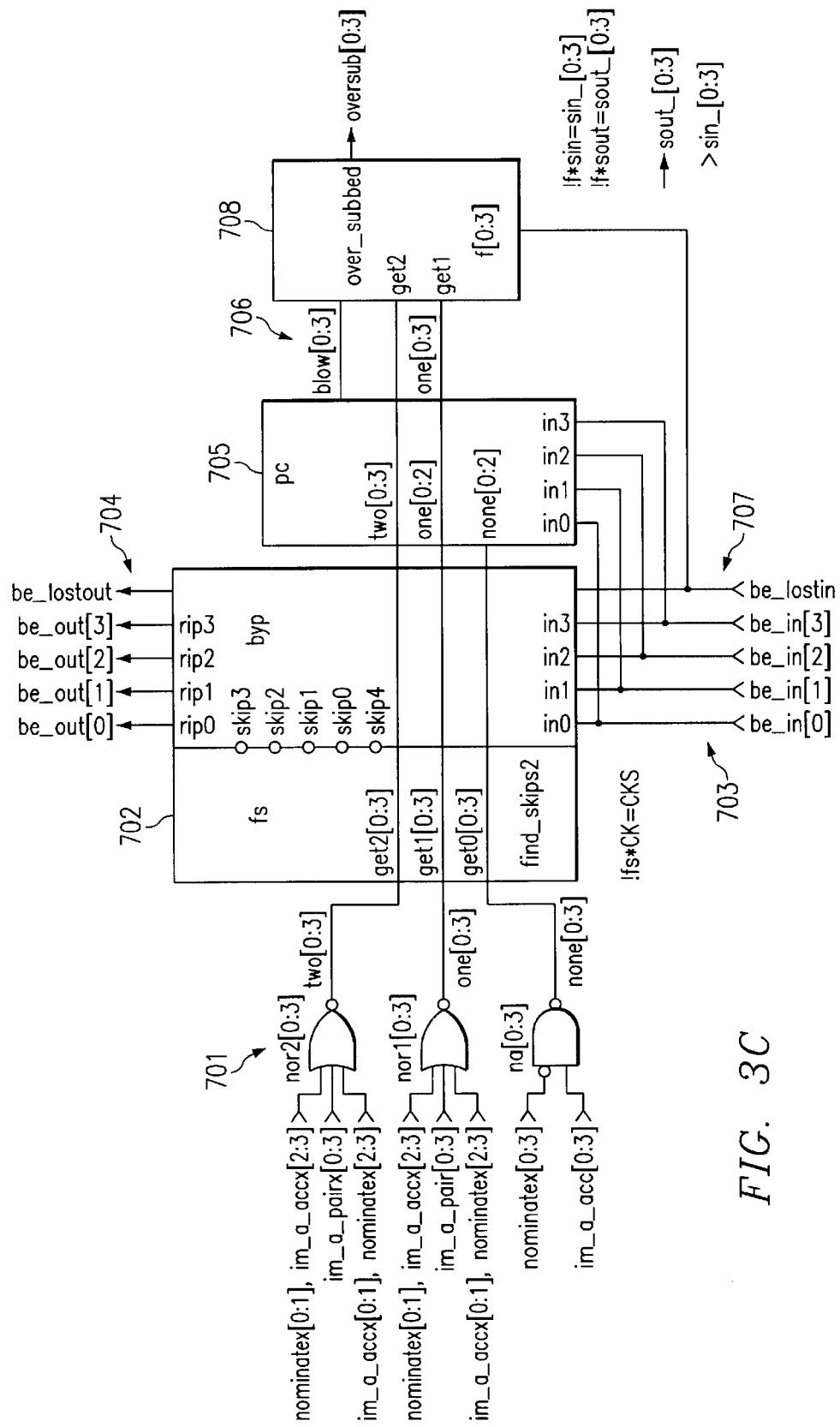
FIG. 3C depicts a more detailed representation of the issuing mechanism of FIG. 3A.
Figure 3D:
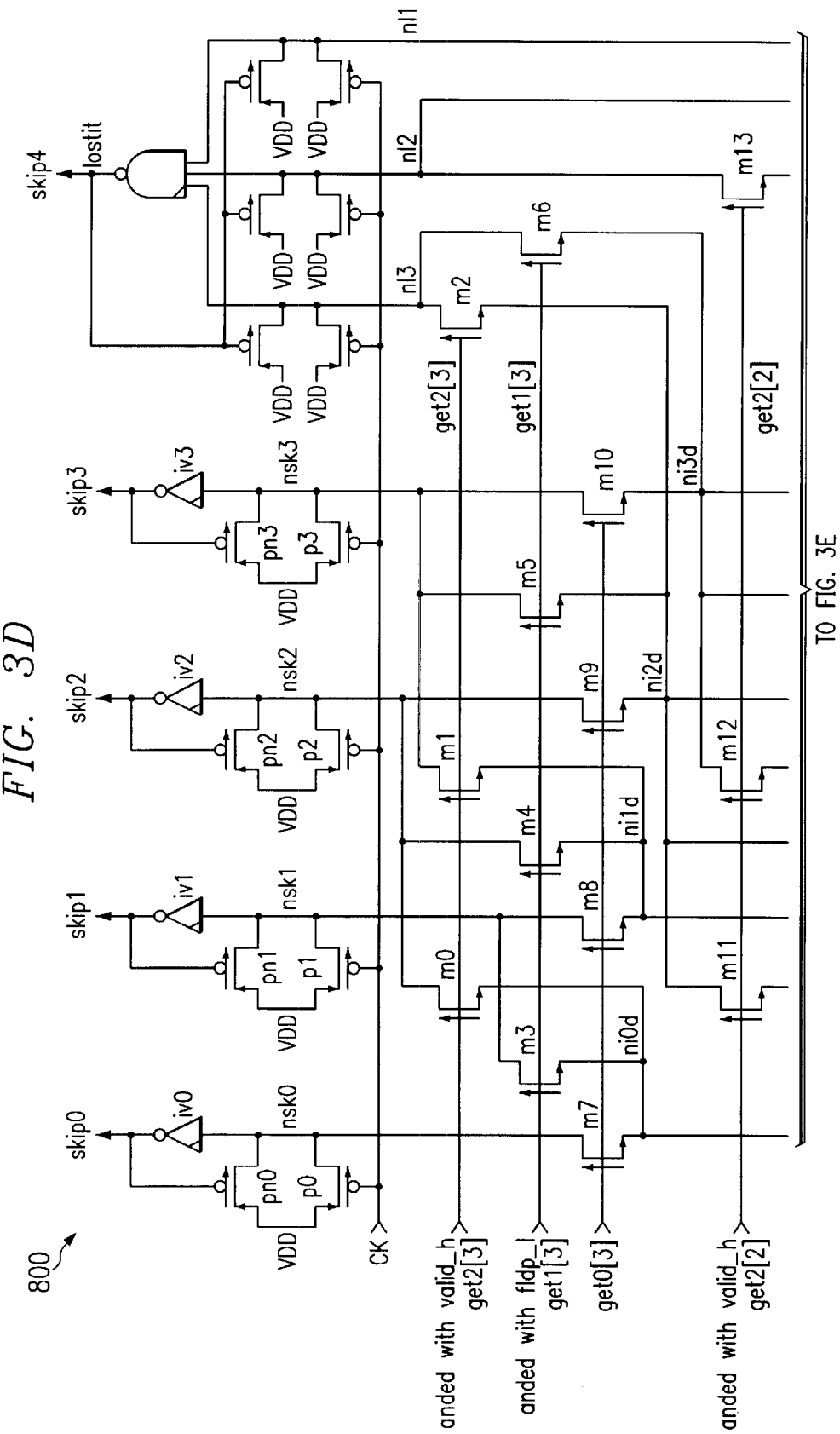
FIGS. 3D–3G depict a more detailed representation of the logic of box 702 of FIG. 3C.
Figure 3E:
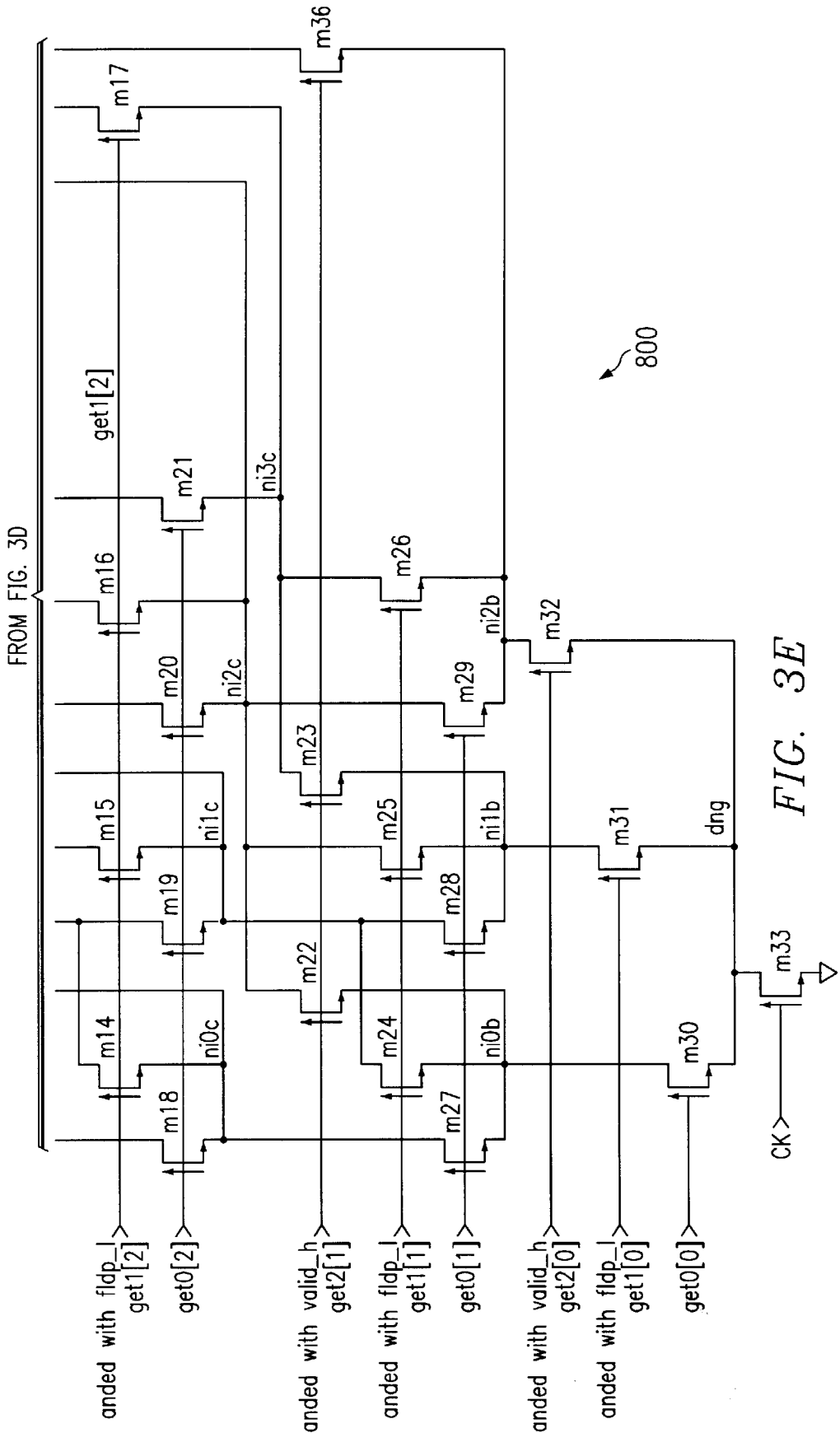
Figure 3F:
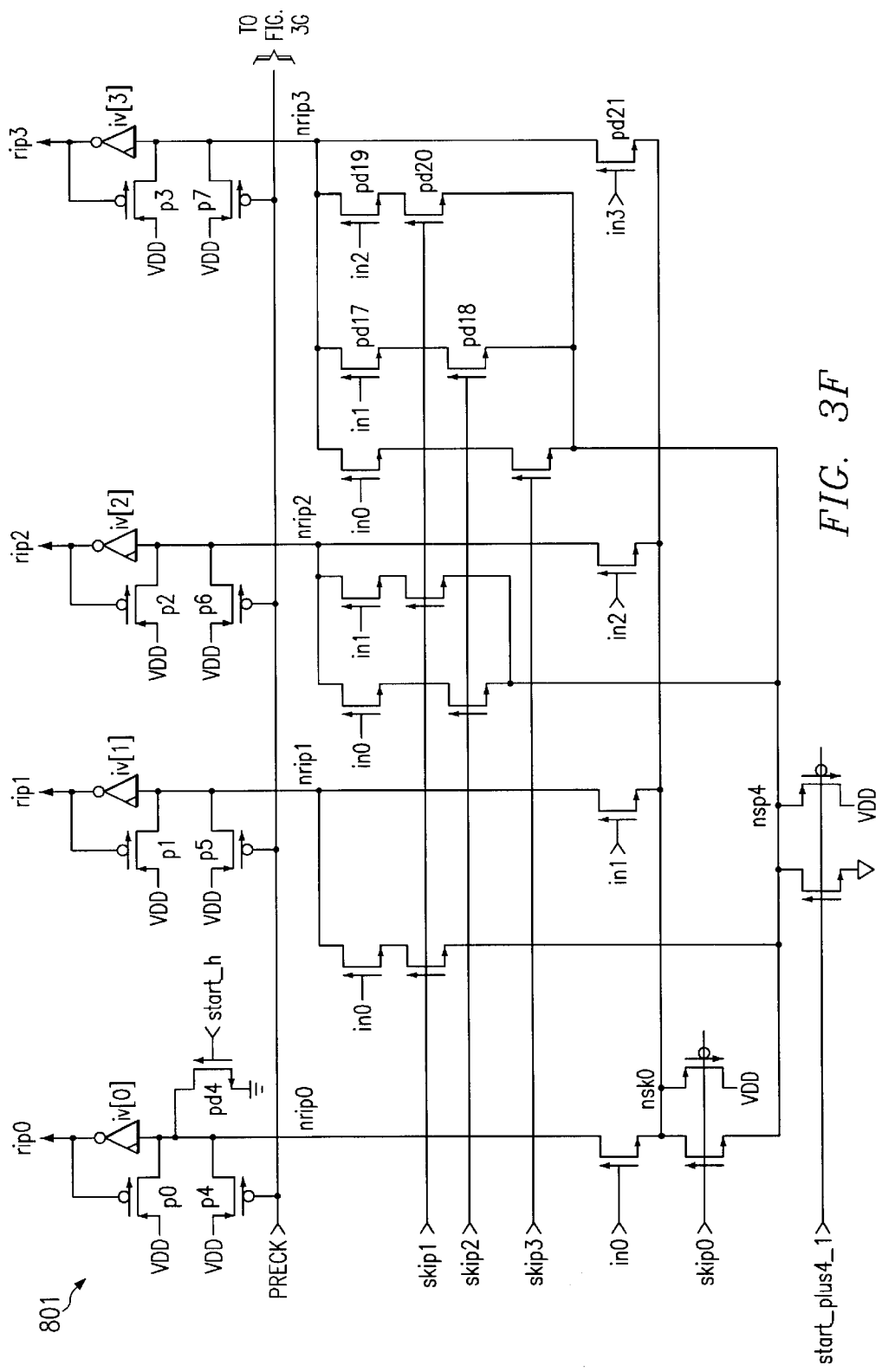
Figure 3G:
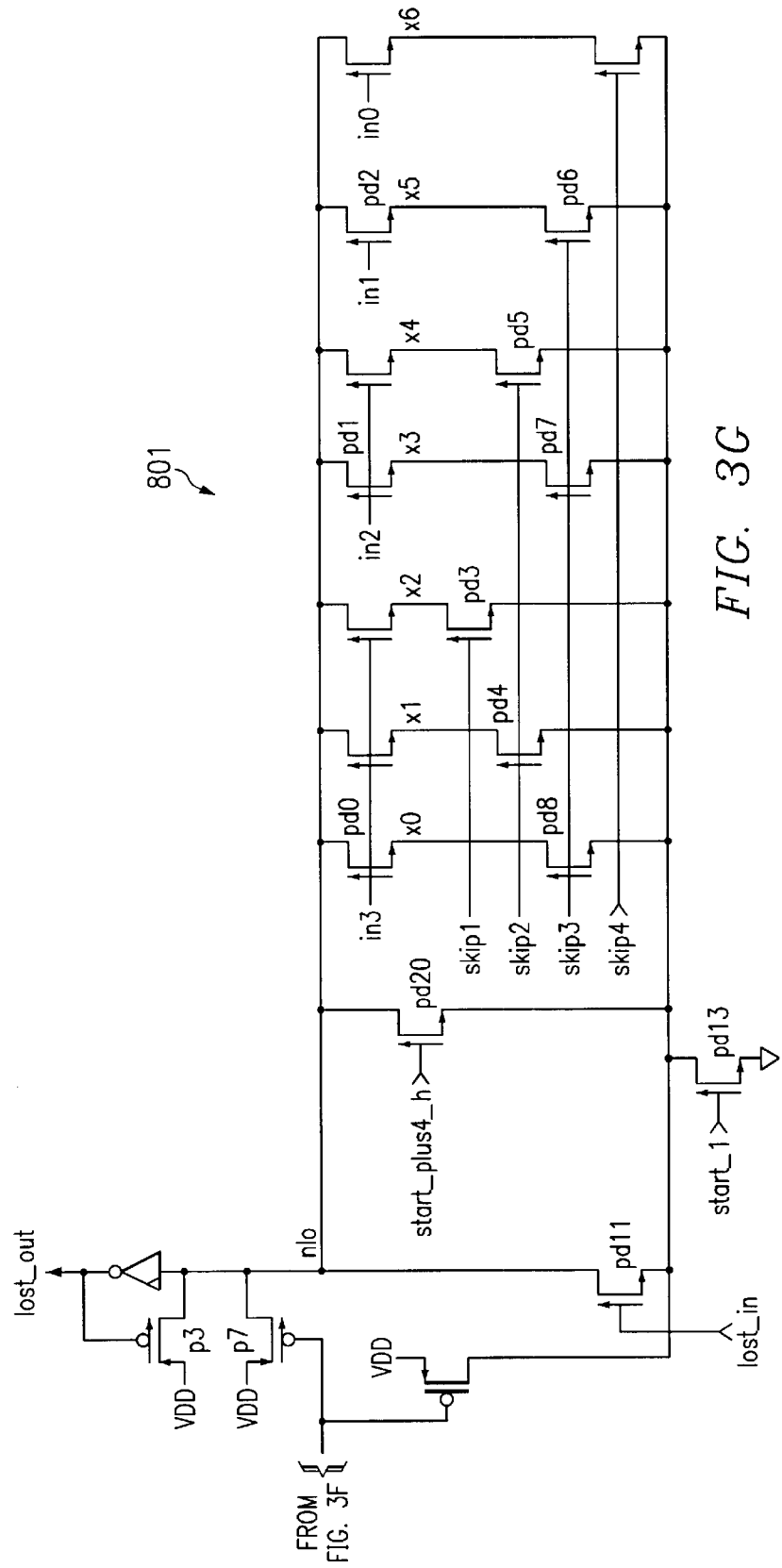

FIG. 3C is a more detailed representation of FIG. 3A. FIG. 3C is used once for every 4 queue entries. That is, there are 8 instantiations of FIG. 3C if there are 32 queue entries in the queuing subsystem. Using one instantiation of FIG. 3C for every 4 queue entries allows the optimal trade off of circuit delay versus complexity for the process this design was implemented in.

FIG. 3C includes 3 gates 701 generating information as to whether an access requires zero, one, or two port resources. Each of the four entries generates its own indications of needing zero, one, or two port resources. A floating point load pair operation will indicate it needs two port resources. A store access will indicate it needs zero port resources. The box 702 has two pieces in it. The transistor schematics for the pieces of box 702 are shown in FIGS. 3D–3E and 3F–3G, as 800 and 801, respectively. The left half, labeled "fs" (shown in more detail in FIGS. 3D–3E) does a special form of carry lookahead to determine if the entire group of four entries will be adding zero, one, two, three, or four or more to the number of port resources currently allocated. The bottom inputs 703 indicate how many port resources are currently allocated before this group of four entries. If be_in [0] is asserted, then there are zero port resources currently allocated, and four are available. If be_in [1] is asserted, then there is one port resource currently allocated, and three are available. If be_lost in 707 is asserted, then four or more port resources have already been allocated. Because the behavior is the same for all entries after the fourth one, once be_lost in 707 is asserted, all later groups of four will also see be_lost in asserted.

The logic in the box 702 generates the inputs for the next group of four entries. It does so consuming the outputs from the previous group of four entries, and adding zero, one, two, three, or four to the number of previously allocated ports as denoted by the be_out wires 704. This carry-lookahead logic is done for speed of execution of the overall logic generation of the oversubscribed output.

Figure 3H:
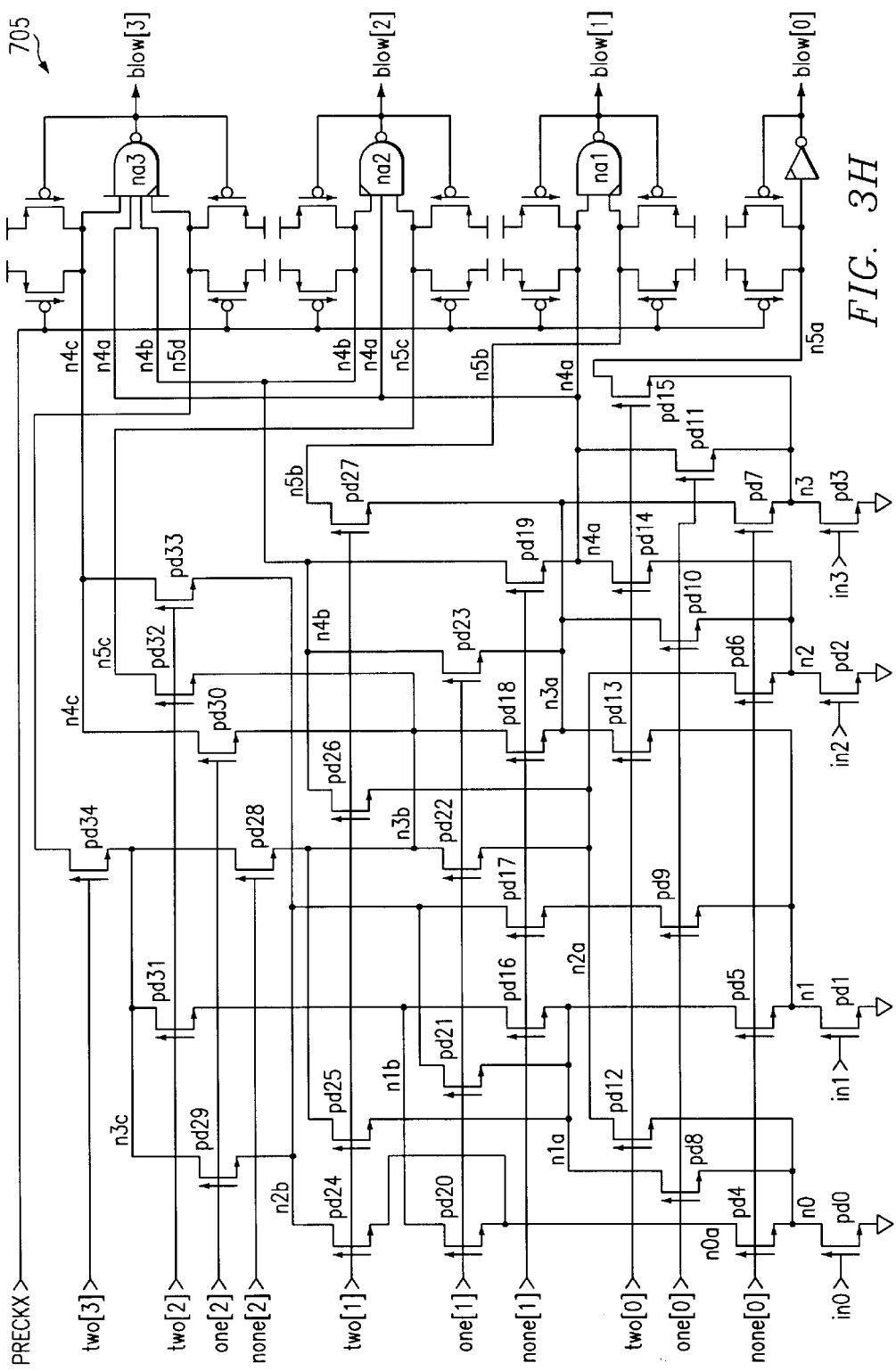
FIG. 3H depicts a more detailed representation of the logic of box 705 of FIG. 3C.

The box 705 takes the zero, one, or two port resource requests and combines them with the number of previously allocated ports, the logic for box 705 being shown in FIG. 3H. The generated output, blow [0:3] 706, is an indication of which entries of the four entries covered by this logic have attempted to cause port allocation of more than 4 entries or which entries have entries below them that have allocated exactly 4 ports. This is a partial indication of oversubscription.

Figure 3I:
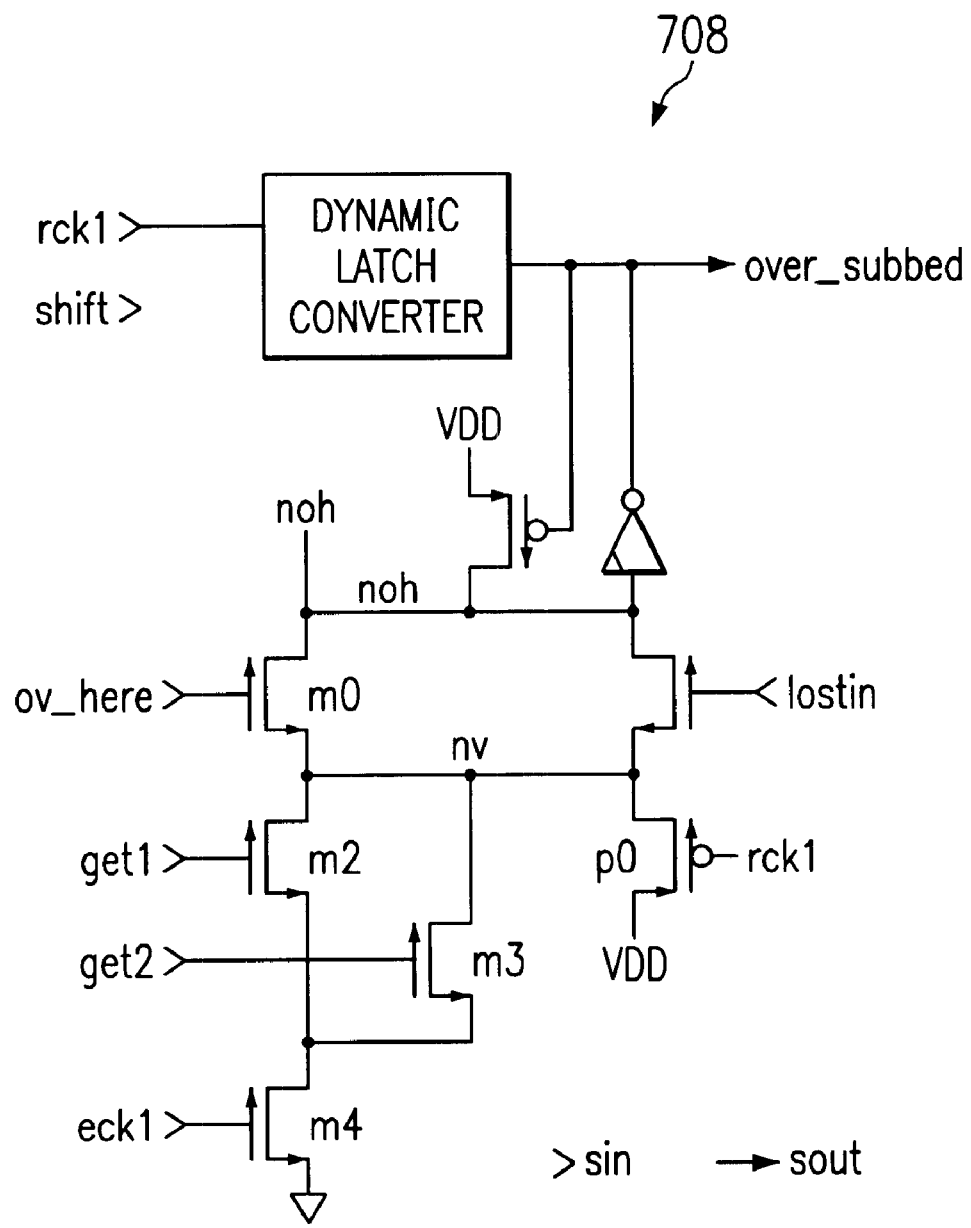
FIG. 3I depicts a more detailed representation of the logic of box 708 of FIG. 3C.
Figure 4:
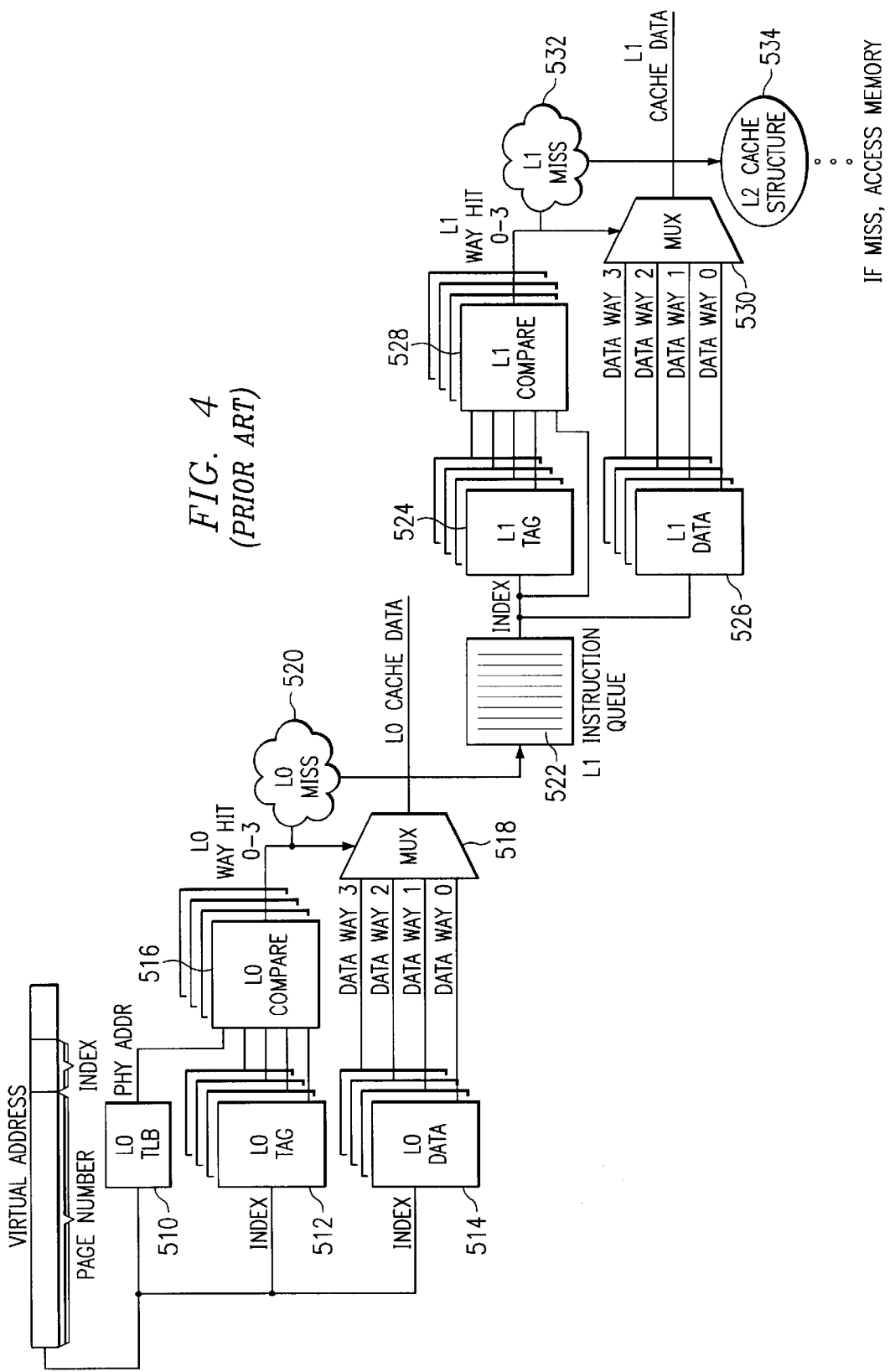
FIG. 4 depicts a prior art arrangement for a cache structure.

To generate the complete oversubscription signal, these blow [0:3] signals 706 must be combined with the be_lost in signal 707. For this, the logic 708 is used, which is shown in FIG. 3I. This block is repeated once for each entry, there is not one of these blocks per four queue entries as for the other blocks. This block generates an oversubscription signal oversub for each entry (the same signal as in 310 of FIG. 3A). This signal is the OR of the be_lost in signal 707 and an indication of whether or not an oversubscribe first occurred in this entry. This is the blow [0:3] signals anded with the one or two port resources requested signals described above. That is, an oversubscribe first appears at an entry where one of two things occurs: four ports have already been allocated, and one or two ports are attempting to allocate here; or, three ports have already been allocated, and two ports are attempting to allocate here. Note that blow [0] corresponds to the first of the four entries, blow [1] corresponds to the second of the four entries, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multi-level cache structure of a computer system, which is accessible by a processor to satisfy memory access requests, wherein said multi-level cache structure is configured to receive multiple memory access requests, and process the multiple requests in parallel, the cache structure comprising:

a queue for holding address information for a plurality of the requests as a plurality of entries, wherein the queue includes issuing logic for determining which requests in the queue should be issued;

the issuing logic comprising find first logic for determining which entries meet a predetermined criteria and selecting a predetermined number of those entries as the issuing entries; and the issuing logic further comprising lost logic that delays the issuing of a selected entry for a predetermined time period based upon a delay criteria.

2. The multi-level cache structure of claim 1 wherein:

the predetermined criteria is age, and wherein the find first logic selects the oldest entries; and the predetermined number is four.

3. The multi-level cache structure of claim 1 wherein:

issuing requests are used to provide the addresses for accessing a storage array of the cache structure.

4. The multi-level cache structure of claim 1 wherein the delay criteria comprises an oversubscription conflict between the issuing entries.

5. The multi-level cache structure of claim 1 wherein:

the delay criteria is an issuing resource conflict; and the predetermined time period is one clock cycle.

6. The multi-level cache structure of claim 5 wherein:

the resource is a port, and the requests are one of load requests and store requests, wherein each load request may require one or two ports, and each store request requires zero ports;

wherein the number of required ports for selected requests is greater than the number of available ports, whereby the lost logic will delay the use of port resources for at least one younger selected entry.

7. A method for operating a multi-level cache structure of a computer system, which is accessible by a processor to satisfy memory access requests, wherein said multi-level cache structure is configured to receive multiple memory access requests, and process the multiple requests in parallel, the method comprising the steps of:

holding address information for a plurality of the requests as a plurality of entries in a queue;

determining which requests in the queue should be issued from the queue, wherein said determining step comprises the steps of determining which entries meet a predetermined criteria and selecting a plurality of those entries determined to meet said predetermined criteria as the issuing entries; and delaying the issuing of a selected entry for a predetermined time period based upon a delay criteria.

8. The method of claim 7 further comprising the step of:

issuing requests to provide the addresses for accessing a storage array of the cache structure.

9. The method of claim 7 wherein said delay criteria comprises an oversubscription conflict between the issuing entries.

10. The method of claim 7 wherein said step of selecting further comprises the step of:

selecting a predetermined number of those entries determined to meet said predetermined criteria as the issuing entries.

11. The method of claim 10 wherein:

the predetermined criteria is age, and wherein the step of selecting comprises selecting the oldest entries; and the predetermined number is four.

12. The method of claim 7 wherein:

the delay criteria is an issuing resource conflict; and the predetermined time period is one clock cycle.

13. The method of claim 12 wherein:

the resource is a port, and the requests are one of load requests and store requests, wherein each load request may require one or two ports, and each store request requires zero ports;

wherein the number of required ports for selected requests is greater than the number of available ports, whereby the use of port resources is delayed for at least one younger selected entry.

14. A multi-level cache structure of a computer system, which is accessible by a processor to satisfy memory access requests, wherein said multi-level cache structure is configured to receive multiple memory access requests, and process the multiple requests in parallel, the cache structure comprising:

means for holding address information for a plurality of the requests as a plurality of entries;

means for determining which requests in the means for holding should be issued from the means for holding, wherein said means for determining comprises means for determining which entries meet a predetermined criteria and means for selecting a plurality of those entries determined to meet said predetermined criteria as the issuing entries; and means for delaying the issuing of a selected entry for a predetermined time period based upon a delay criteria, wherein said delay criteria comprises an issuing resource conflict.

15. The multi-level cache structure of claim 14 wherein the issuing resource comprises a port.

16. The multi-level cache structure of claim 14 wherein said issuing resource conflict comprises an oversubscription conflict between the issuing entries.

17. The multi-level cache structure of claim 14 wherein said means for selecting comprises means for selecting a predetermined number of those entries determined to meet said predetermined criteria as the issuing entries.

18. The multi-level cache structure of claim 14, wherein:

the predetermined criteria is age, and wherein the means for selecting selects the oldest entries; and the predetermined number is four.

19. The multi-level cache structure of claim 14 wherein:

the predetermined time period is one clock cycle.

20. The multi-level cache structure of claim 19 wherein:

the resource is a port, and the requests are one of load requests and store requests, wherein each load request may require one or two ports, and each store request requires zero ports;

wherein the number of required ports for selected requests is greater than the number of available ports, whereby the means for delaying will delay the use of port resources for at least one younger selected entry.

* * * * *